United States Patent [19]
Sinclair

[11] Patent Number: 5,964,486
[45] Date of Patent: Oct. 12, 1999

[54] PIPE CONNECTORS

[75] Inventor: David Malcolm Sinclair, Aberdeen, United Kingdom

[73] Assignee: Oil States Industries (UK) Limited, Alberdeen, United Kingdom

[21] Appl. No.: 09/045,861

[22] Filed: Mar. 23, 1998

[30] Foreign Application Priority Data

Mar. 24, 1997 [GB] United Kingdom .................. 9706084

[51] Int. Cl.⁶ ..................................................... F16L 25/00
[52] U.S. Cl. .......................... 285/331; 285/334; 285/382; 285/906
[58] Field of Search ................................ 285/382, 382.1, 285/382.2, 334, 333, 331, 906

[56] References Cited

U.S. PATENT DOCUMENTS

| | | | |
|---|---|---|---|
| 4,298,221 | 11/1981 | McGugan | 285/382 X |
| 4,525,001 | 6/1985 | Lumsden et al. | 285/382 X |
| 5,709,417 | 1/1998 | Verbeck | 285/382.2 |

FOREIGN PATENT DOCUMENTS

| | | |
|---|---|---|
| 2 033 518 | 5/1980 | United Kingdom . |
| 2 099 529 | 12/1982 | United Kingdom . |
| 2 113 335 | 8/1983 | United Kingdom . |
| 2 138 089 | 10/1984 | United Kingdom . |

*Primary Examiner*—Dave W. Arola
*Attorney, Agent, or Firm*—Watson Cole Grindle Watson

[57] ABSTRACT

A pipe connector comprising a tubular pin member (1) having an outer generally frusto-conical surface and a tubular box member (2) having an inner surface corresponding to the surface of the pin member which overlies the surface of the pin member when the members are fully engaged. The central portions (3a,4a) of the frusto-conical surfaces are provided with complementary inter-engaging formations (5,6) and end portions (3b,3c,4b,4c), which are generally spaced apart, have abutting annular rings (20,21) to transfer hoop stresses caused by a pressure difference across the walls of the connector. Following wear of the connector (1,2) the rib also serves to reduce the material removed from the or each member when it is re-cut.

9 Claims, 4 Drawing Sheets

PIPE CONNECTORS

The present invention relates to improvements in pipe connectors particularly but not exclusively for use in the oil industry for connecting metal pipe sections of a pipe string. More particularly, the invention relates to improvements in the type of a pipe connector described in patents GB 1573945, GB2033518, GB2099529. GB2113335 and GB2 13 8089.

This type of pipe connector comprises a tubular pin member having a generally frusto-conical outer peripheral surface and a tubular box member having a generally frusto-conical inner peripheral surface corresponding to the frusto-conical outer peripheral surface of the pin member. The two members may be made separately and fixed, for example bolted or welded, to the ends of pipe sections to be connected thereby or they may be formed on the ends of the pipe sections themselves. In use, the two members, each associated with a pipe section, are telescoped together and are axially locked together by inter-engageable annular projections and grooves provided on the said peripheral surfaces, the projections and grooves being spaced apart along the two surfaces.

In telescoping the two members together, they are initially telescoped until surface contact is made between crest surfaces of the projections and surfaces between the grooves. Hydraulic fluid under pressure may then be supplied between the overlapped parts of the surfaces to expand the box member and/or contract the pin member to permit the members to be fully telescoped together. Alternatively, the members may simply be pushed together. Pressurised hydraulic fluid is also used to disengage the members by expanding the box member and/or contracting the pin member to bring the projections out of disengagement with the corresponding grooves.

In order to reduce the axial extent of the members, projections and grooves may be provided which have relatively small axial extents but this means that, to fully telescope the members together after they have been brought into initial contact, it is necessary to move individual projections past at least one groove before each projection is aligned with the groove in which it is designed to engage. In doing this, there is a risk that the projections and grooves may inter-engage before the members are fully telescoped together and it may then prove impossible to disengage the projections and grooves. To avoid this, some at least of a the projections and grooves have different axial extents and/or spacings, so that the projections and grooves cannot inter-engage before the members are fully engaged. The arrangement may be such that in all intermediate positions of the members prior to full engagement and after the frusto-conical surfaces have been brought into initial surface contact, there is contact between the crests of at least some of the projections and surfaces between the grooves spaced apart along the overlying parts of the frusto-conical surfaces.

In the connector described in GB2138089, the projections and grooves are spaced from the ends of the frusto-conical surfaces of the members and sealing means for sealing between the surfaces are provided at or adjacent the ends of the surfaces. These may be provided in conjunction with means radially restraining the free ends of the members. As described, each of the members may be provided at its free end with an axially projecting annular nib which engages in a groove in the corresponding member for increasing sealing at the ends of the frusto-conical surfaces to ensure that there is no loss, or no significant loss, of pressure in the hydraulic fluid used to disengage the members.

The sealing means may comprise a radially extending collar on an end portion of the frusto-conical surface at the free end of one member which is in forcefit engagement with an end portion of the frusto-conical surface of the other member, that portion of the frusto-conical surface with which it engages being cylindrical.

The present invention relates to a connector for connecting pipe sections comprising a tubular pin member having a generally frusto-conical outer peripheral surface and a tubular box member having a generally frusto-conical inner peripheral surface corresponding to the frusto-conical outer peripheral surface of the pin member and which overlies the outer peripheral surface of the pin member when the members are fully engaged together, each frusto-conical surface comprising a central portion and end portions between the central portion and the ends of the surfaces, the central portions of the surfaces being provided with a plurality of annular projections and grooves which are inter-engaged when the members are fully engaged together to axially lock the members together, means being provided for sealing the free end of one member to the other member when the members are fully engaged together, wherein the end portions of the members adjacent the free end of the one member are radially spaced apart and a radially extending annular rib is provided intermediate the ends of each end portion, the ribs being axially aligned and radially dimensioned so that, when the members are fully engaged together, the crest surfaces of the ribs are in contact or substantially in contact so that in use where there is a substantial pressure difference across the walls of the connector, the ribs serve to transfer hoop stresses in the region of the one end surface portion of one member of the connector to the other.

Where the pipe connector is subject to high internal pressures, the one member is the pin member. Where the pipe connector is subject to high external pressures, the one member is the box member.

The crest surfaces of the ribs may be frusto-conical and may have the same conicity as the crest surfaces of the projections and surfaces between the grooves of the two members.

The members of the pipe connector may be designed to be machined directly on the ends of pipe sections to be connected thereby.

Where the free end of the pin member or the box member is provided with a radially projecting annular collar to form a seal at that end of the connector, the adjacent rib on the pin or box member may project radially beyond the collar and otherwise be dimensioned so that, following wear of the connector, the pin or box member may be re-cut on the end of the pipe section by cutting back the original connector to the rib, the rib then providing the material for the annular sealing collar.

Further features and advantages of the present invention will become apparent from the following description of an embodiment thereof given by way of example only with reference to the accompanying drawings, in which.

Figure 1:
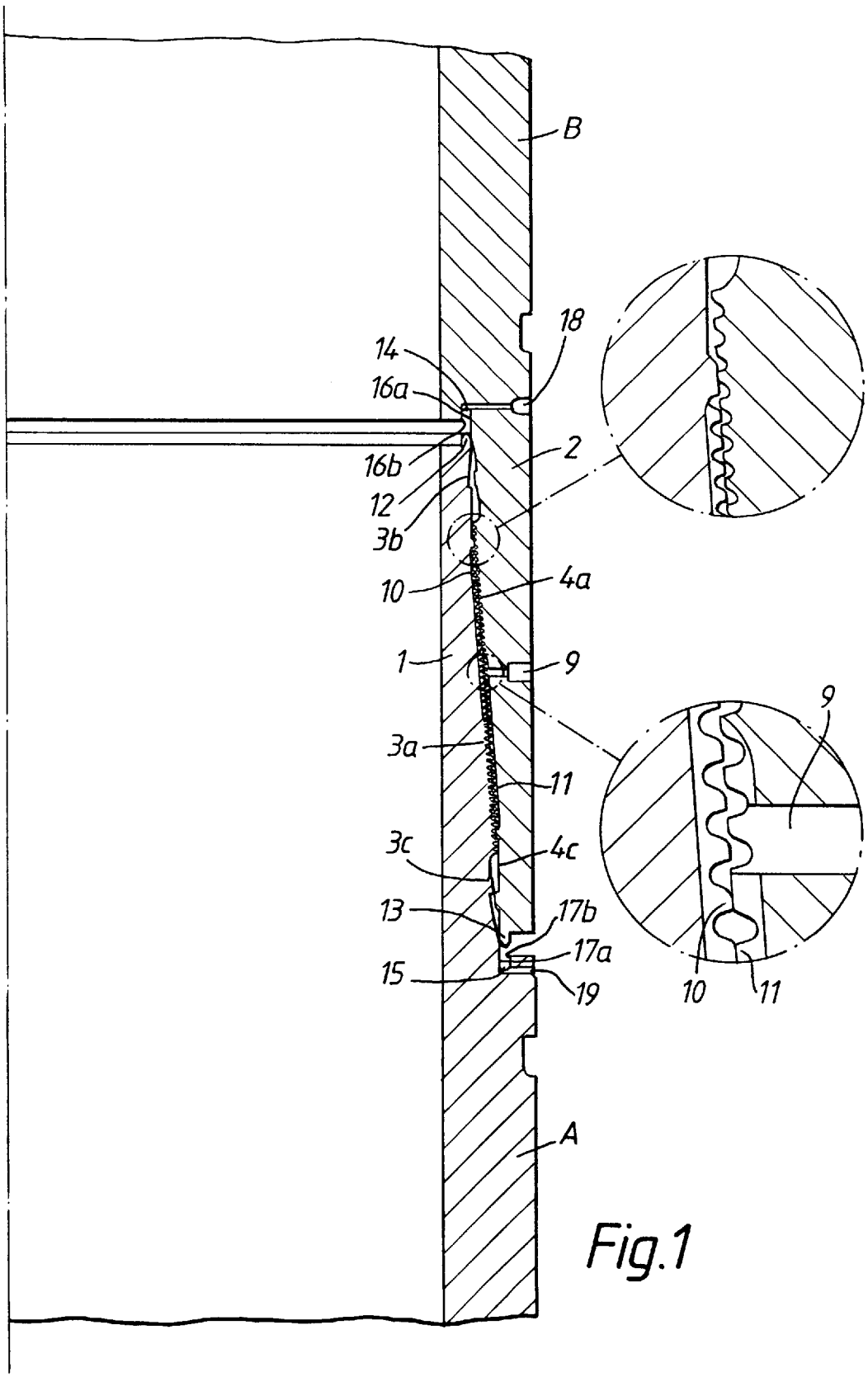
FIG. 1 is an axial section through an embodiment of pipe connector showing the members in their initial telescoped together positions.
Figure 2:
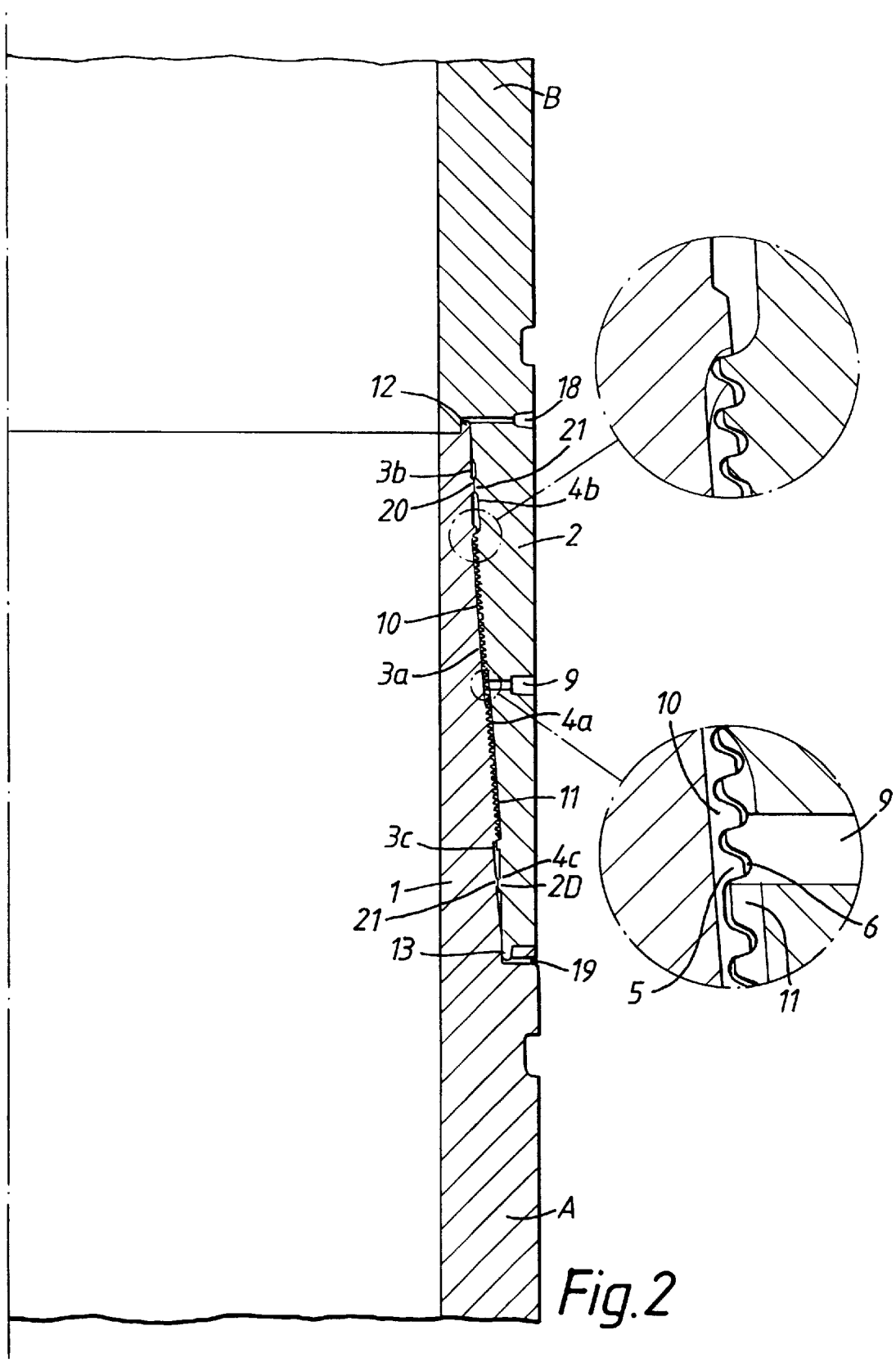
FIG. 2 is a section similar to that of FIG. 1 but showing the members fully engaged together.

FIGS. 1 and 2 show a pipe connector comprising a tubular pin member 1 and a tubular box member 2, which may be formed separately for connection, e.g. by welding or bolting to the ends of two pipe sections to be connected thereby. Alternatively and, as shown, the members are formed or cut directly on the ends of the pipe sections A, B. The members are designed to be telescoped together with the outer peripheral surface 3 of the pin member 1 and the inner peripheral surface 4 of the box member 2 overlying each other, the surfaces 3, 4 being generally frusto-conical and provided with annular projections 5 and grooves 6 in a central portion 3a, 4a of each surface. The annular projections 5 and grooves 6 are axially spaced apart along the surfaces 3, 4 and are relatively dimensioned so that, when the members are fully engaged together, corresponding ones of the projections inter-engage in the grooves to axially lock the members together. As described herein, the pin member 1 has projections 5 and the box member 2 has grooves 6 but it will be understood that these descriptions can be reversed with the pin member having grooves and box member having projections.

The projections and grooves may be shaped, dimensioned and arranged as described in GB1573945, GB2033518, GB2099529, GB2113335 and GB2138089, and, as described in these specifications, the crest surfaces 7 of the projections, the surfaces between the projections, the root surfaces of the grooves and the surfaces 8 between the grooves, may all lie on conical surfaces which have substantially the same conicity so that, when the members are fully engaged together, the radial extent of the overlap between the engaged projections and grooves is the same for all the projections and grooves. In a modification, the extent of axial overlap between the projections and grooves may be reduced in the regions of the ends of the central portions 3a, 4a of the surfaces 3, 4 to facilitate disengagement.

Engagement of the members takes place in two stages. Initially, the members are brought together until contact is established between crest surfaces 7 of the projections 5 and surfaces 8 between the grooves 6. Thereafter, force is applied axially to complete engagement of the members. At the end of the first stage, a projection may yet have to pass over a plurality, for example three or four, grooves before it reaches its corresponding groove in which it is to engage. With this arrangement, to prevent inadvertent engagement of a projection with a groove which is not its corresponding groove, i.e. before the members are fully telescoped together, corresponding pairs of the projections and grooves may be provided with differing axial extents and spacings along the length of the surfaces 3a, 4a. The projections 5 and grooves 6 are then arranged, for example as described in GB 2113335, so that at intermediate positions during telescoping of the members 1, 2, after the members have been brought into initial contact, at least some of the crest surfaces 7 of projections 5 spaced along the central portion of the surface 3 and intermediate the ends of the central portion, are aligned with surfaces 8 between the grooves 6, to prevent premature inter-engagement of the projections and grooves.

The arrangement and axial dimensioning of the annular projections and grooves to prevent intermediate inter-engagement of them can be obtained in any number of different ways, for example as described in GB2113335.

After the members have been telescoped together to their initial positions, they may be fully engaged by simply applying an axial force to the members. Engagement may however be assisted by the application of pressurised hydraulic fluid to the overlapped portions of the surfaces 3, 4. The members may be disengaged in the same way, the pressurised fluid expanding the box and/or contracting the pin to permit engagement and disengagement, and lubricating the crest surfaces 7 of the projections 5 and surfaces 8 between the grooves 6 to facilitate sliding of these surfaces over one another. For this purpose, the box member 2 is provided with a radial duct 9 for connection to a source of pressurised hydraulic fluid. The duct 9 opens inwardly of the box member into the region of the central portion 4a of the surface 4 of the box which is provided with the grooves. To ensure that the hydraulic fluid is able to flow along the full length of the overlapped portions of the surfaces of the members, axially extending grooves 10, 11 are provided, one in the pin member 1 and the other in the box member 2, the duct 9 opening into the groove 11 in the box member.

To ensure sealing at the ends of the surfaces 3, 4 of the members, and to guard against inadvertent escape of the pressurised hydraulic fluid from between the members during disengagement of the members, sealing means may be provided at or adjacent the ends of the surfaces 3, 4 and the sealing means may be provided in conjunction with means radially restraining the free ends of the members. As shown, the sealing and radially restraining means comprise an annular axially extending nib or projection 12, 13 provided at the free end of each member and which is received in a corresponding groove 14, 15 at the inner end of the surface of the other member. Each nib 12, 13 seals laterally against surface portions 16a, 16b and 17a, 17b of its groove in the other member, the contacting surfaces being appropriately shaped for this purpose. In effect, each nib 12, 13 is in full interference fit in its corresponding groove when the members are fully engaged together. Surface portions 16a and 17a which, as shown, are generally cylindrical, are extended along the surfaces of the members so that the nibs 12, 13 make sealing contact with these surfaces before the members are fully engaged. The nibs 12, 13 are, as shown, provided with radially extending collars 12a, 13a which engage the surfaces 16a, 17a, as described in GB2138089. Indeed, sealing between the nibs and grooves may be achieved in a variety of different ways as described in GB2 13 8089.

To allow hydraulic fluid to bleed away from the region of the nibs 12, 13 during assembly of the connector, thereby ensuring that the fluid does not become trapped and prevent full engagement, ducts 18, 19 are provided connecting the bottoms of the grooves 14, 15 with the exterior of the members.

Figure 3:
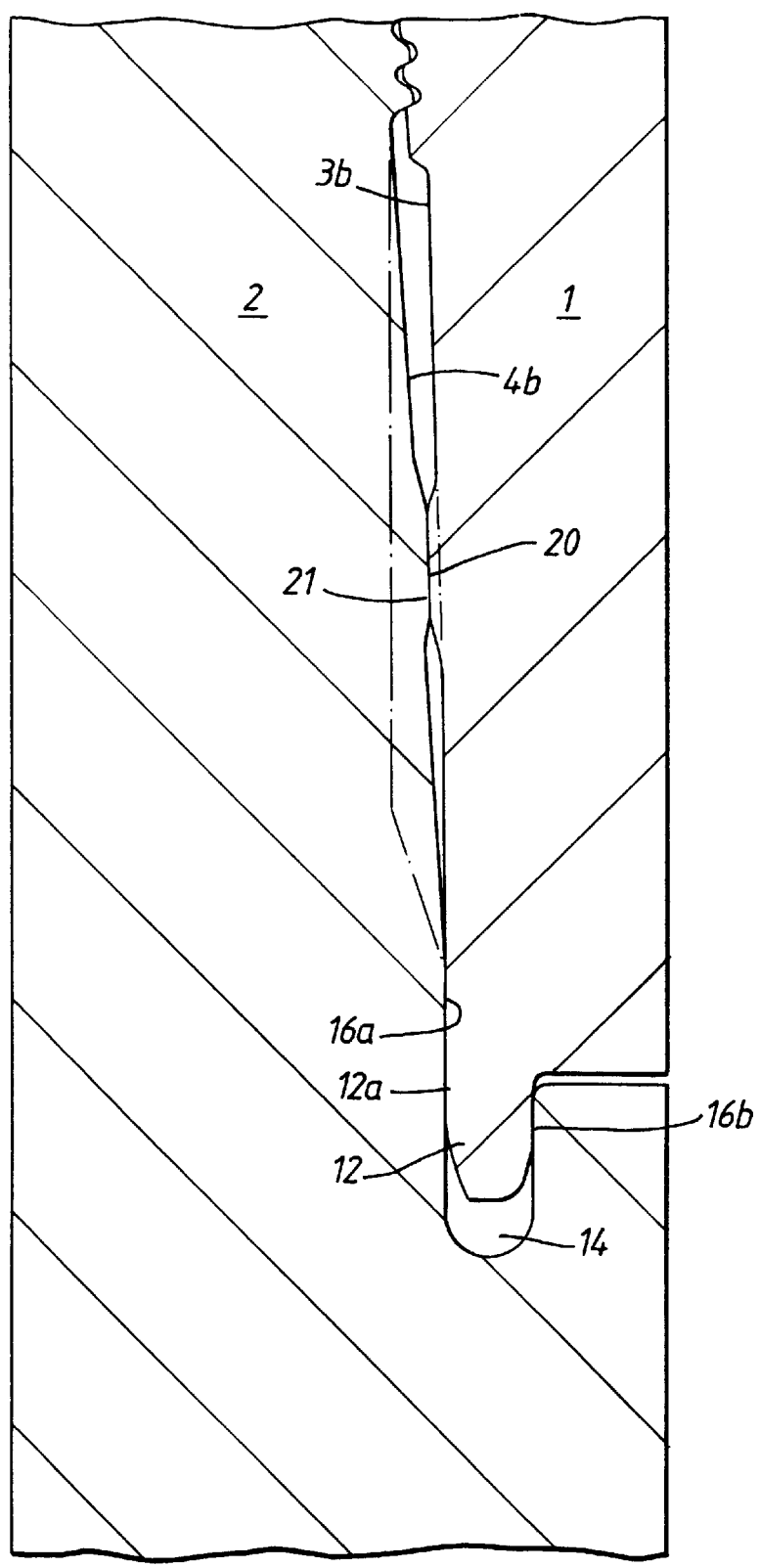
FIG. 3 is an enlarged sectional view through part of the pipe connector shown in FIGS. 1 and 2 showing parts of both the pin and box members including the free end of the pin member and the corresponding part of the box member.

The generally frusto-conical surfaces 3, 4 of the members also include end portions 3b, 4b and 3c, 4c between the ends of the central portions 3a, 4a and the nibs 12, 13 and corresponding grooves 14, 15. The lengths of these surface portions are dependent on the radial extent of engagement between the projections and grooves and the pressure of the hydraulic fluid used to disengage the member. In previously known pipe connectors of this type, the surfaces of the end surface portions 3b, 4b and 3c, 4c are radially spaced apart even when the members are fully engaged together. As shown in outline in FIG. 3, the end surface portions lie generally on cones but with different cone angles and which are smaller than the angles of the cones enveloping the crest surfaces of the projections and surfaces between the grooves, and so that the end surface portions progressively approach and come into contact in the region of the nibs 12, 13 and grooves 14, 15.

However, with this arrangement, it is found that when there is a substantial differential pressure across the connector between the interior and the exterior, high hoop stresses develop in the walls of the connector in the regions of these end surface portions. To reduce these hoop stresses, and consequential deflections, intermediate the ends of these end portions 3b, 4b and 3c, 4c of the surfaces 3, 4, at least one radially extending annular rib 20, 21 is provided in each end surface portion. The or each pair of ribs 20, 21 are axially aligned when the members are fully engaged together so as to oppose each other and are radially dimensioned so that the crest surfaces of the ribs are in contact or substantially in contact when the members are fully engaged together. In use, where a substantial pressure difference develops across the walls of the connector, hoop stresses are transferred from one member to the other through contact between the crest surfaces of these ribs.

The number of pairs of ribs 20, 21 provided in each end portion of the connector depends on the length of the end surface portions 3b, 4b and 3c, 4c and the hoop stresses to be sustained. Where a single pair of ribs 20, 21 is provided it will generally be arranged centrally between the ends of the end portion concerned.

It will be appreciated that, if a connector is only to be subject to high internal pressures, then it may be sufficient to provide these ribs only in the end portion adjacent the free end of the pin member and the corresponding end portion of the box member, where the wall of the pin member is of smallest thickness. Where the connector is only to be subject to high external pressures, it may be sufficient to provide these ribs only in the end portion adjacent the free end of the box member and the corresponding end portion of the pin member, where the thickness of the wall of the box member is smallest.

Where the members 1, 2 are cut directly on the ends of the pipe section, when the members 1, 2 become worn, it is not simply a matter of cutting off the entire members and re-cutting them because this would involve too great a loss of length of the pipe section. The aim is to reduce to a minimum the amount of material to be cut off.

With the above described members, the amount of material which has to be cut off to form the new free end of the member can be significantly reduced by appropriate dimensioning and positioning of the rib 20 or one of the ribs 20 provided on the free end of each of the members relative to the collars 12a, 13a.

Figure 4:
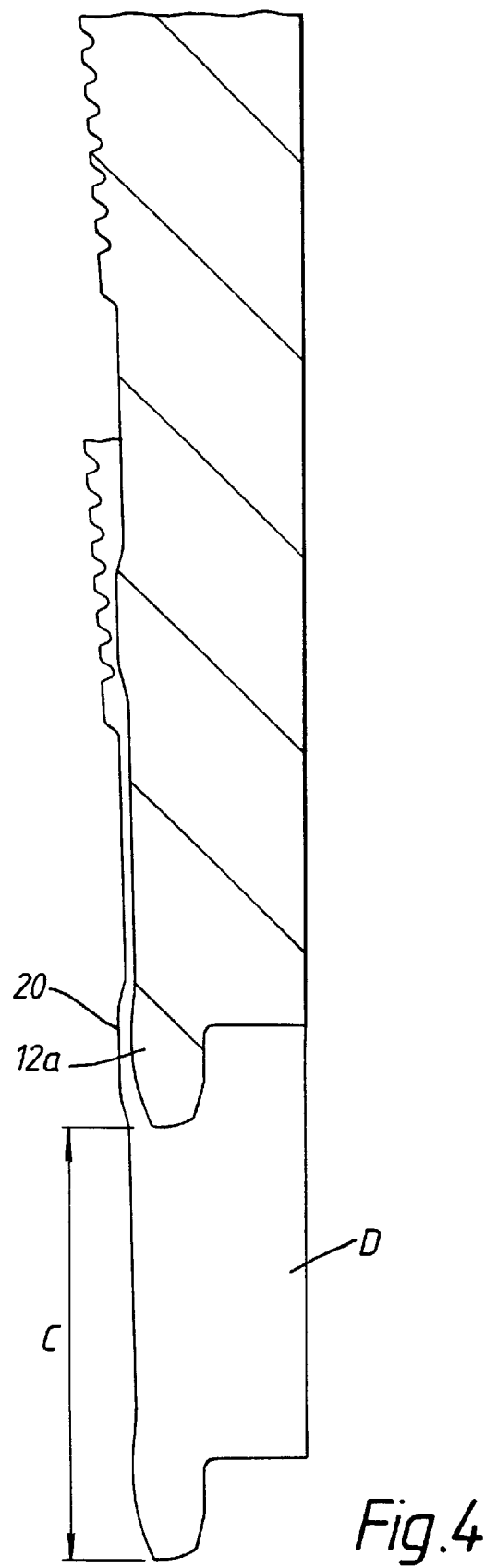
FIG. 4 is an axial section through the pin member of a connector according to FIGS. 1 and 2 showing how it can be re-cut following wear.

As shown in FIG. 4, the rib 20 on the pin member (or that closest to the free end of the pin member) is radially dimensioned so that it will provide the material for the collar 12a which is formed on the nib 12 of the pin member. The only part of the material D that is lost in re-cutting the pin member is the length C between the original nib 12 at the free end of the member to the original rib 20.

The length C depends on the maximum radial extent of the grooves and projections and the cone angle of the surfaces of the projections and grooves. It is independent of the length of the end portions 3b, 4b and 3c, 4c. Accordingly, where the rib 20 (or one of the ribs 20) is positioned to form the collar 12a when the member is re-cut and is spaced from the centre of the end portions 3b, 4b or 3c, 4c, at least another pair of ribs 20, 21 may be provided.

Although FIG. 4 has been described above as showing the pin member, it could equally be considered to show the box member and what happens in re-cutting the box member.

The members of the above described pipe connector may, for example, be made of high tensile steel. The invention is applicable to pipe connectors having a variety of diameters and wall thicknesses and, by way of example only, the outside diameter of the pipe section may vary between 36"/91.44 cm (and larger) and 8⅝"/21.91 cm (and smaller).

I claim:

1. A connector for connecting pipe sections comprising a tubular pin member having a generally frusto-conical outer peripheral surface and a tubular box member having a generally frusto-conical inner peripheral surface corresponding to the frustro-conical outer peripheral surface of the pin member and which overlies the outer peripheral surface of the pin member when the members are fully engaged together, each frusto-conical surface comprising a central portion and end portions, the central portions of the surfaces being provided with a plurality of annular projections and grooves which are inter-engaged when the members are fully engaged together to axially lock the members together, means being provided for sealing a free end of one member to the other member when the members are fully engaged together, wherein end surface portions of the members adjacent the free end of the one member are radially spaced apart and a radially extending annular rib is provided intermediate the ends of each end portion, the ribs being axially aligned and radially dimensioned so that, when the members are fully engaged together, the crest surfaces of the ribs are in contact, and where there is a substantial pressure difference across the walls of the connector, the ribs serve to transfer hoop stresses in the region of the one end surface portion of one member of the connectors to the other.

2. A connector according to claim 1 wherein the one member is the pin member.

3. A connector according to claim 1 wherein the one member is the box member.

4. A connector according to claim 1 wherein the crest surfaces of the ribs are frusto-conical.

5. A connector according to claim 4, wherein the crest surfaces of the ribs have substantially the same conicity as the crest surfaces of the projections and the surfaces between the grooves.

6. A pipe connector according to claim 1, wherein the members are integral with the pipe sections.

7. A pipe connector according to claim 1, wherein the ribs are arranged substantially centrally of the end portions.

8. A connector according to claim 1, wherein at least two pairs of ribs are provided between the ends of the end portions.

9. A connector according to claim 1, wherein said means for sealing comprises an annular collar to form a seal at the end of the connector with a complementary recess, and each annular rib projects radially beyond the collar and is otherwise dimension so that, following wear of the connector, each member may be re-cut by cutting back the original connector to the rib, the rib then providing the material for the annular collar.

* * * * *